United States Patent [19]
Copson

[11] Patent Number: 5,115,751
[45] Date of Patent: May 26, 1992

[54] APPARATUS AND METHOD FOR SUBAQUEOUS WASTE DISPOSAL

[76] Inventor: Alex G. Copson, 26 Dover Street, London W1X 3PA, England

[21] Appl. No.: 468,918

[22] Filed: Jan. 23, 1990

[30] Foreign Application Priority Data

Jan. 23, 1989 [GB] United Kingdom ............... 8901420
Jan. 23, 1989 [GB] United Kingdom ............... 8901421

[51] Int. Cl.⁵ ......................................... B62B 35/30
[52] U.S. Cl. ..................................... 114/27; 114/26; 114/270; 405/154
[58] Field of Search ........................... 114/26-38, 114/144 B, 264, 265, 270; 405/154; 137/236.1; 141/1

[56] References Cited

U.S. PATENT DOCUMENTS

| | | | |
|---|---|---|---|
| 4,307,679 | 12/1981 | Goldsberry et al. | 114/26 |
| 4,400,115 | 8/1983 | Biancale et al. | 405/303 |
| 4,829,923 | 5/1989 | Copson et al. | 114/26 |
| 4,878,446 | 11/1989 | Vermeulen | 114/27 |

FOREIGN PATENT DOCUMENTS

| | | | |
|---|---|---|---|
| 69388 | 6/1978 | Japan | 114/27 |
| 112386 | 9/1981 | Japan | 114/26 |
| 195487 | 11/1984 | Japan | 114/26 |
| 198595 | 9/1987 | Japan | 114/27 |

Primary Examiner—Jesús D. Sotelo
Assistant Examiner—Stephen P. Avila
Attorney, Agent, or Firm—Poms, Smith, Lande & Rose

[57] ABSTRACT

A method for disposal of material on subaqueous ground substantially without said material coming into contact with the surrounding water is disclosed. The method comprises positioning a ship carrying said material above a selected site for disposal, transferring said material to a container or vehicle adapted to transport said material to the subaqueous ground, conveying said material to a level at, or close to, said subaqueous ground and depositing said material from said container onto said subaqueous ground. The method can be used to deposit two materials one over the other—i.e. by capping—which is valuable where the first material is a contaiminated waste product, and the second is an uncontaminated waste product. A ship for use in the method of the invention is also disclosed.

22 Claims, 8 Drawing Sheets

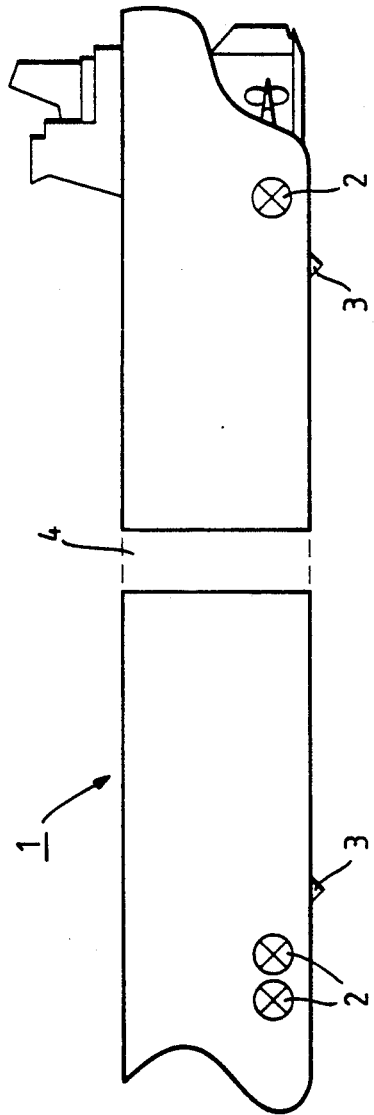
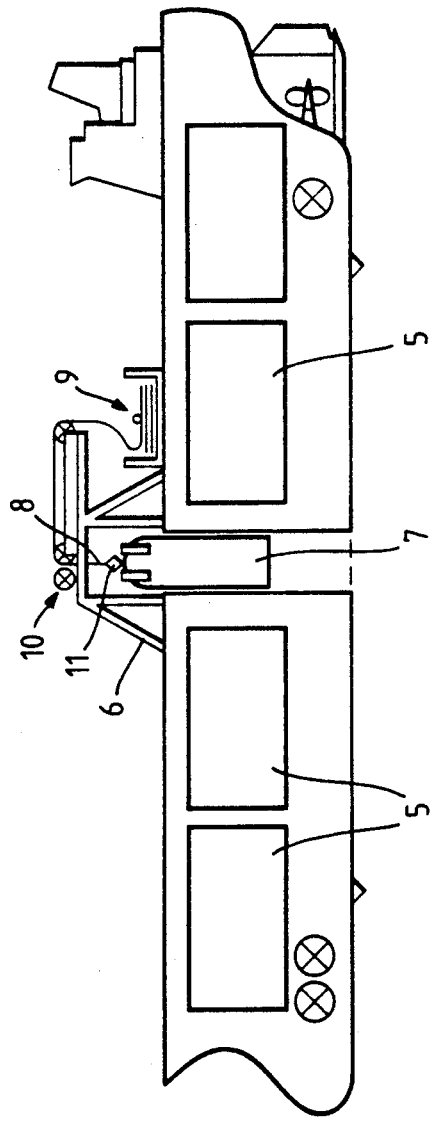
Fig. 1a.
Fig. 1b.

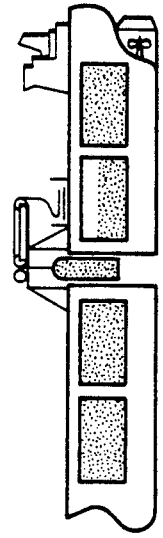
Fig. 3a.
Fig. 3b.
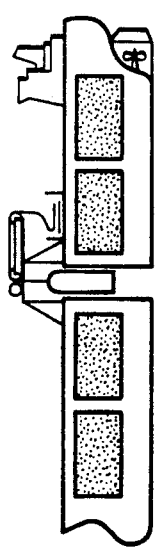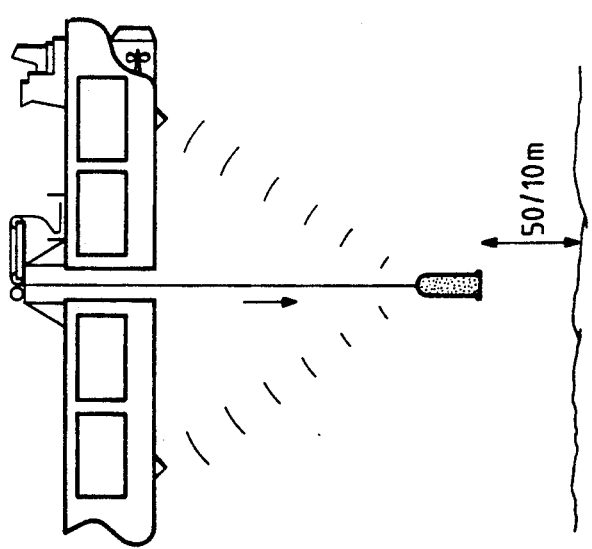
Fig. 3c.
Fig. 3d.
50/10 m

21

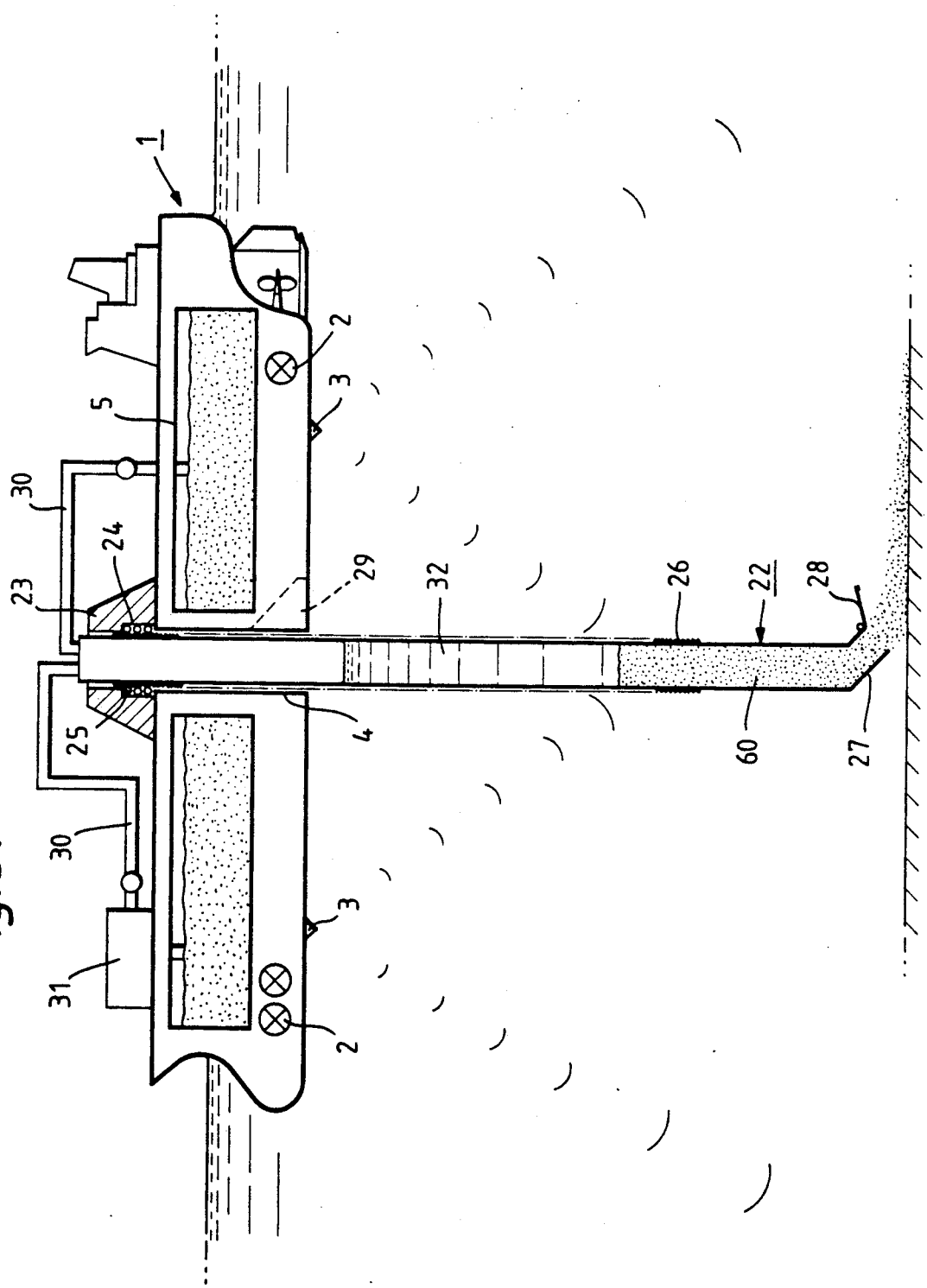

APPARATUS AND METHOD FOR SUBAQUEOUS WASTE DISPOSAL

The disposal of waste material is a major problem in the present age of increasing awareness of environmental pollution. In many instances waste materials are disposed of in the sea. Some materials are simply dumped from ships or pumped into the water. Such surface dumping leads to widespread pollution of the surface waters due to dispersal of waste matter as it sinks towards the sea bed. Some contaminants may be carried considerable distances from the dumping site by currents. The marine environment over a wide area may be affected, as may fish and other living organisms in the locality.

In order to avoid or substantially reduce the risk of widespread pollution during the disposal of large quantities of waste material in the sea, it is desirable to deposit the waste on or close to the seabed either at deep water sites (e.g. about 4000-5000 m depth) which may have little or no marine life and negligible local currents, or in shallow water sites where a regime known as "subaqueous capping" is operated to localise the deleterious effects of dumping waste in such waters. Under this regime, waste with a high contaminant content ("dirty waste") is first dumped from a ship at a chosen shallow water site, and then waste with a relatively low contaminant content ("clean waste") is dumped over the top. This tends to cover the dirty waste with clean waste, thereby "capping" the dump site.

An object of the invention is thus to provide a method and an apparatus for disposing of waste or other material on the seabed in both shallow and deep waters, in which the waste material is delivered directly to the seabed without dispersing in the surrounding water.

Another object of the invention is to provide an apparatus which provides an improvement over the known subaqueous capping method.

According to one aspect of the present invention there is provided a method for disposal of material on subaqueous ground substantially without said material coming into contact with the surrounding water, which comprises positioning a ship carrying said material above a selected site for disposal, transferring said material to a container or vehicle adapted to transport said material to the subqueous ground, conveying said material to a level at, or close to, said subaqueous ground and depositing said material from said container onto said subaqueous ground.

According to a second aspect of the invention, there is provided a method of disposal of material on subaqueous ground substantially without said material coming into contact with the surrounding water, which comprises positioning and propelling a ship carrying said material to deposit a first material at a level close to or on said subaqueous ground in a strip wise manner and to deposit a second material over the deposited first material.

Preferably, the ship is positioned and propelled to deposit a second material so as to form a capping layer over the first material. After the ship has deposited the first material the ship can be propelled on a second transverse over the subaqueous ground, during which the second material is deposited in a stripwise manner on top of the deposited first material. Alternatively, the second material can be deposited over the first material substantially simultaneously with deposition of the first material. The first material and second material can be deposited from a single ship, and may comprise contaminated waste and substantially uncontaminated waste, respectively. For convenience, the term "waste material" will be used hereinafter to refer to a material to be deposited by the method of this invention, regardless of the nature of the material.

Preferably, the container or vehicle for transporting the waste material is a hollow tube, which may be divided longitudinally to provide separate channels for passage of the first material and the second material. This hollow tube may be disposed within a frame which may be triangular in section. Advantageously, the tube has cameras mounted thereon for visual monitoring of the disposal of the material. The hollow tube may be lowered to a level at, or close to, the subaqueous ground by drive means engaging the periphery of the tube.

Alternatively, the container or vehicle is a bucket, which may be arranged to deposit the material through a hinged door at its base. This hinged door may be opened and closed by hydraulic or pneumatic rams. The bucket may be conveyed to the subaqueous ground by a rope, cable or chain and preferably has its internal surface provided with a non-stick coating.

During disposal the ship may be held on station at the disposal site by means of satellite navigational aids and thrusters and also by means of sensors comprising sonar transponders.

Preferably the material is subjected to processing prior to its transfer into the container or vehicle, but may be subjected to processing either during the step of conveying the material to the subaqueous ground or while it is in the container or vehicle before being conveyed to the subaqueous ground. This treatment is preferably a chemical treatment which may comprise flocculation and/or coagulation. The chemical reagents or additives may be injected into the material through one or more nozzles and may be mixed into the material by an homogenising grating. The material may comprise dredged spoils, contaminated soil, flyash, slurry or sewerage.

According to a third aspect of the invention, there is provided a ship adapted for disposal of material on subaqueous ground substantially without said material coming into contact with the surrounding water, which ship includes means for carrying said material, a container or vehicle adapted to transport said material to the subaqueous ground, and a moon-pool through which said container or vehicle is conveyed to said subaqueous ground.

For a better understanding of the invention and to show how the same may be carried into effect, reference will now be made, by way of example, to the accompanying drawings in which:

FIGS. 1(a) and 1(b) are schematic sections of a first embodiment of a ship for disposal of waste in accordance with the invention;

FIG. 2 illustrates schematically a section through a container for waste disposal;

FIGS. 3(a) to (d) illustrate a sequence using the container for waste disposal;

FIGS. 4(a) to (d) show in detail part of the sequence for waste disposal using the container.

FIG. 5 is a schematic sectional view of second embodiment of a ship for disposal of waste in accordance with the invention;

Figure 2:
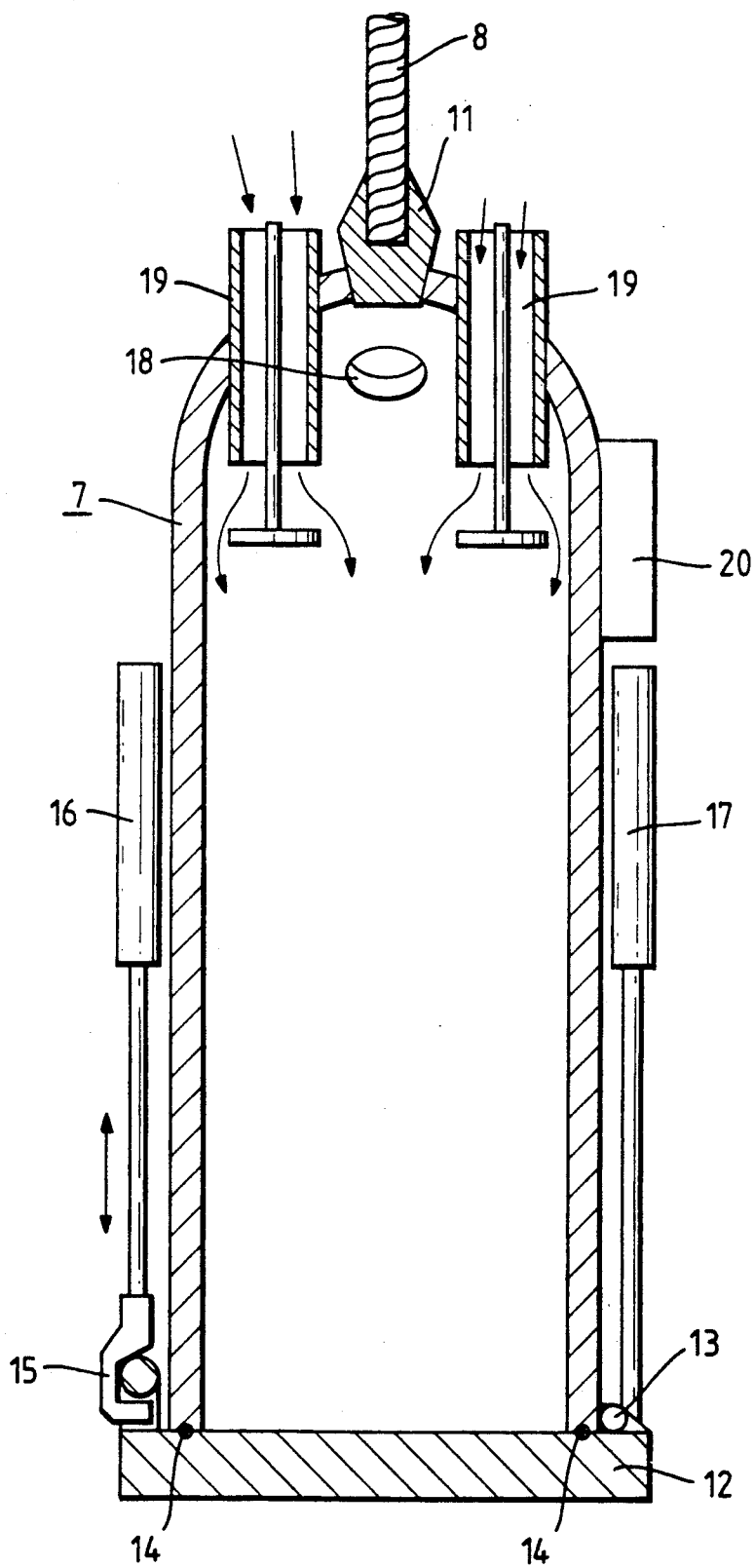

Referring now to FIG. 1(a), a suitable waste disposal vessel would, for example, be a sea going ship 1 of about 40,000 tonnes displacement. The ship has a dynamic positioning system using thrusters 2 to allow it to hold station over a selected seabed site during disposal operations. The ship also has sensors 3 (such as sonar transponders) mounted beneath the hull which allow monitoring of the seabed and monitoring of any objects beneath the ship. There is a hole or moon pool 4 formed through the hull of the ship and opening into the sea beneath the ship; this moon-pool 4 allows passage of a container or vehicle for waste material through the body of the ship and into the sea below.

As shown in FIG. 1(a) according to a first embodiment of the invention the ship has storage tanks 5 for carrying waste material. On the deck there is an A-frame gantry 6 which straddles the moon-pool. A container 7 is supported by a tether 8. The tether is a cable, chain or rope (e.g. "Kevlar" (trade mark)). If the tether is a cable, it may be wound on a reel (not shown). Preferably, the tether is a rope, and in this case the rope can be coiled in a rope store 9. The rope passes via a traction unit 10 to be attached to the container at an attachment swivel 11. The tether is sufficiently long to allow lowering of the container to the seabed; the container can be winched back to the ship from the seabed by means of the tether and the traction unit. The tether has a design strength sufficient to support the weight of a container and its contents (e.g. a breaking strain of several thousand tonnes) and should be designed to be capable of withstanding considerable stretching forces.

The container 7 shown in FIG. 2 has a casing of generally closed cylindrical shape and which defines a space for containing waste materials. The container is designed to be hung from the tether 8 by means of the attachment swivel 11. The base or bottom end of the container, opposite the swivel attachment, is closable by a door 12 mounted on a hinge 13. Seals 14 are provided between the casing ends and the door. A lock mechanism 15 is provided to releasably engage part of the door and there is a ram 16 connected to the lock mechanism to lock or unlock the sealing of the door. A second ram 17 is attached to the door in the vicinity of the hinge and is used to close the door.

A loading port 18 is provided in the upper part of the casing by means of which waste material may be loaded into the container. The loading port can be sealed after the container is loaded.

Also in the upper part of the container are mounted vent apertures fitted with non-return valves 19. The non-return valves provide passages for access into the interior of the container but prevent the exit of material from the container through the vents.

The container of this example is fabricated from steel, has a mass of about 120 tonnes and an internal capacity of about 2500 m³. This container could, for example, hold about 4000 tonnes of solid waste such as contaminated soil, dredged spoil, flyash and the like. Alternatively, the container could hold liquid wastes or slurries (e.g. sewerage sludge of about 5% solids by weight).

A method of waste disposal using the container will now be described by way of example, with reference to the use of a container of the type illustrated by FIG. 2.

Referring to FIG. 3, a general sequence of operation will be described. The ship is loaded with waste material and is taken to a deep water site suitable for waste disposal, FIG. 3(a). Waste material is then loaded into the container whilst the container is held within the moon-pool of the ship, FIG. 3 (b). The filled container is sealed and is then lowered towards the seabed on the tether. The ship is maintained in position by the dynamic positioning system. The position of the container relative to the ship and relative to the seabed is monitored during deployment of the container, FIG. 3(c).

As the container nears the seabed its descent is slowed so that the descent is arrested before it reaches the seabed. The container should stop about 10–50 m above the seabed.

The container carries a control pack (FIG. 2, numeral 20) which allows remote operation of the ram 16 to unlock the door of the container. As the door drops open under the weight of the contained waste, the waste material drops down to be deposited onto the seabed. The load on the tether is thereby reduced and any stretching of the tether will be reduced tending to allow the container to rise somewhat towards the surface. The tether is winched in to complete the retrieval of the container into the ships moon-pool, FIG. 3(d).

FIG. 4 shows in more detail some features of the sequence for waste disposal according to this embodiment of the invention. When the descent of the container is arrested just above the seabed, remote signalling can be used to check that the disposal system is ready for operation, FIG. 4(a). As shown in FIG. 4(b), as the door is released the contained material drops as a mass to the seabed under the influence of gravity. In order that the release of the waste material is not held back by the creation of a vacuum in the upper part of the container 21, the one way valves open as the waste drops. The cavity formed behind the waste material is flooded with sea water which replaces the expelled material.

Figure 4A:
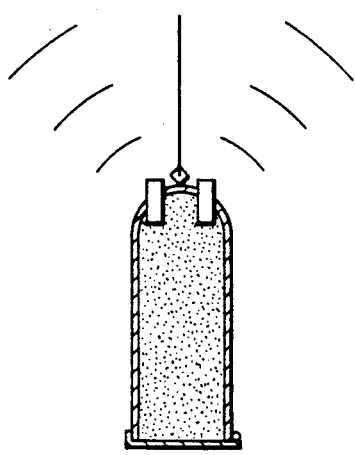
Figure 4B:
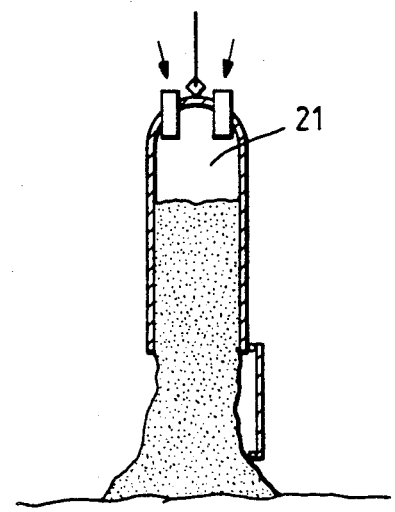
Figure 4C:
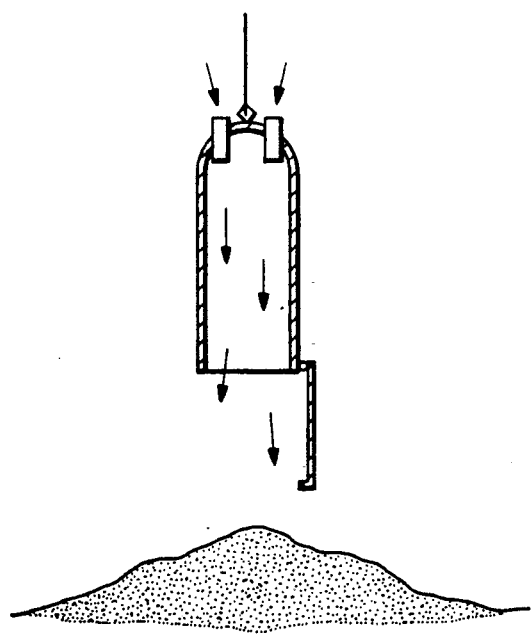
Figure 4D:
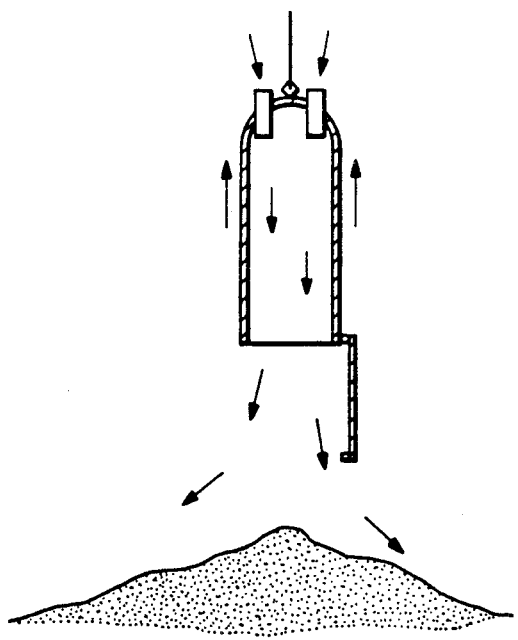

As the sea water rushes into the container it tends to flush the waste material out through the open door, FIG. 4(c). As shown in FIG. 4(d), further flushing of the inside of the container occurs by the passage of seawater through the vents via the one way valves as the container is raised towards the surface with the door remaining open. Any traces of waste material will tend to be washed out of the container before the container gets near to the water surface.

By using this form of the invention it is possible to deposit a large mass of waster material directly onto the seabed at great depth without risk of polluting the sea water through which the material has had to pass on its journey from the surface to the seabed.

Various additional features may be included within the scope of this embodiment of the invention. For example, the inside surface of the container may be polished or treated with "non-stick" material in order to assist the smooth expulsion of the waste from the container at the seabed. Furthermore, the waste may have added to it various treating agents, e.g. chemical additives such as flocculants and/or stabilizers. The treating agents may be added to the waste material as it is loaded into the container, but alternatively there could be inlet ports in the casing of the container for introducing treating agents directly into the material. In some cases it is envisaged that the container will be filled to maximum capacity with waste material, and in other cases the container might be part-filled with sea water and the waste material then added thereto.

In describing a second embodiment of the invention, reference will be made to FIG. 5. Passing through a portion of the hull of the ship there is a moon-pool 4. In the moon-pool is mounted an elongate hollow tube 22 of circular cross section. On the deck of the ship, over the moon-pool, there is a gantry 23 housing a driving mechanism 24 which engages the periphery of the tube and can operate to control raising and lowering of the trunk relative to the hull of the ship. The driving mechanism in this embodiment comprises a set of toothed drive wheels 25 which engage notched portions 26 on the outer surface of the tube.

At the lower end of the tube there is an exit chute 27 in the form of an extension of the tube angled rearwardly relative to the ships hull. The chute is closable by a hinged door 28. When the tube is raised to its maximum extent a major portion of the tube projects above the deck of the ship, and the chute is received in a correspondingly shaped recess 29 in the underside of the hull.

The ship has sensors 3 (e.g., sonar transponders) to measure the water depth below the hull. The information received is used to ensure that when the tube is in a lowered position it does not ever actually touch the bottom. The ship has a dynamic positioning system in which satellite navigational aids are used to accurately locate the ship and thrusters 2 are used to maintain the ship's position over a selected subaqueous site.

The ship will travel to and from the selected site with the tube in the raised position and will lower the tube only at the site. When the tube is in the lowered position, waste material may be conveyed from the holds to the tube via conduits 30. In the illustrated embodiment there is a chemical treatment plant 31 on the deck through which waste material passes in the conduit between the hold and the tube. As shown, the tube holds a portion of waste material 60 above which there is a head of water 32. As an alternative the tube could contain waste material only. In any case, when the door of the exit chute is opened, as the ship moves slowly forward the waste material can pass out of the tube to be laid in a continuous strip on the seabed below the ship. Because the positioning system on the ship gives an accurate location for each strip of waste laid on the bottom, it is possible to repeat the process whereby successive strips are laid side by side or one on top of another to achieve subaqueous capping. Alternatively, a single ship may deposit both materials in a single traverse provided that it is suitably equipped, e.g. with two tubes instead of the single tube 22 shown in FIG. 5.

Figure 6:
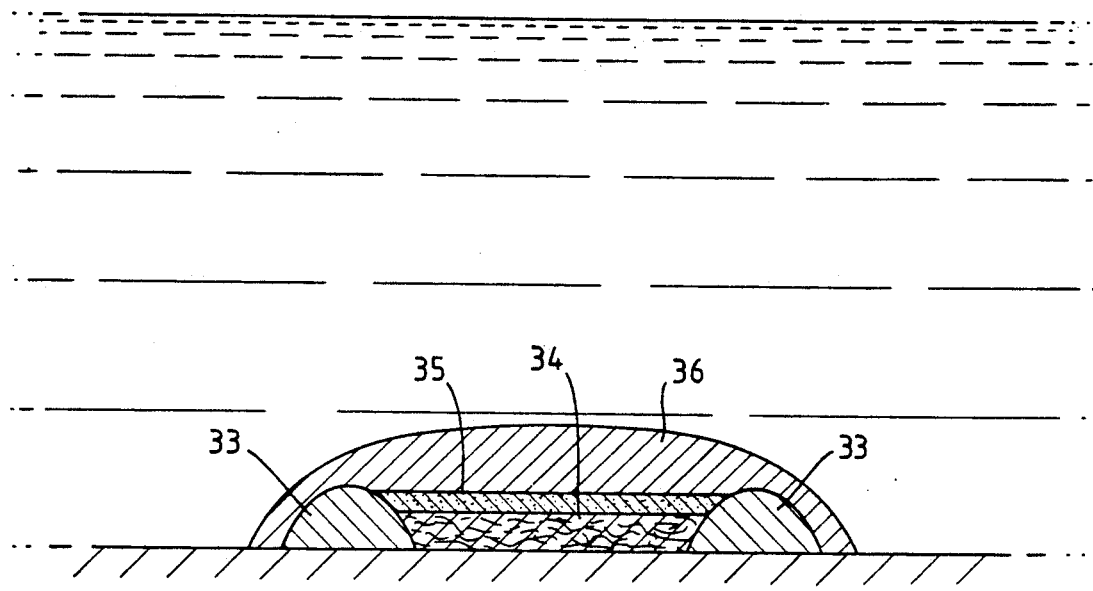
FIG. 6 is a schematic cross section through a subqueous capped waste disposal site.

FIG. 6 shows how a capped site could be built up by first laying a surrounding wall 33 of clean waste, then laying successive strips of dirty waste 34, 35 within the wall, and finally covering over the dirty waste with a cap of clean waste 36. The site may be built up on a grid plan by criss-crossing the site with the ship. The disposal site could, for example, be a square with sides about 1 km in length. By using this technique there is an improvement in the chances that the waste material (especially contaminants from the dirty waste) will not be dispersed in the surrounding water.

Figure 8:
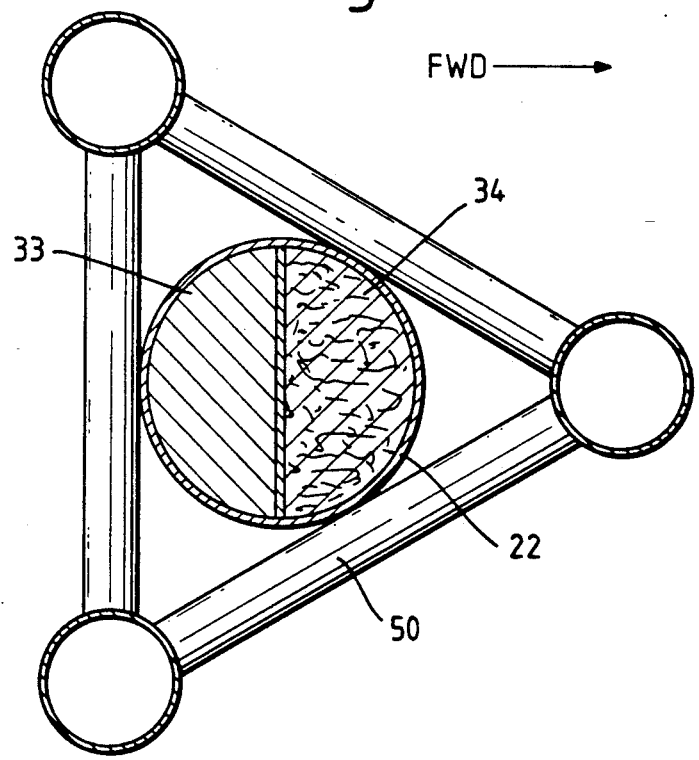
FIG. 8 is a plan view of a preferred form of the part shown in FIG. 7.
Figure 7:
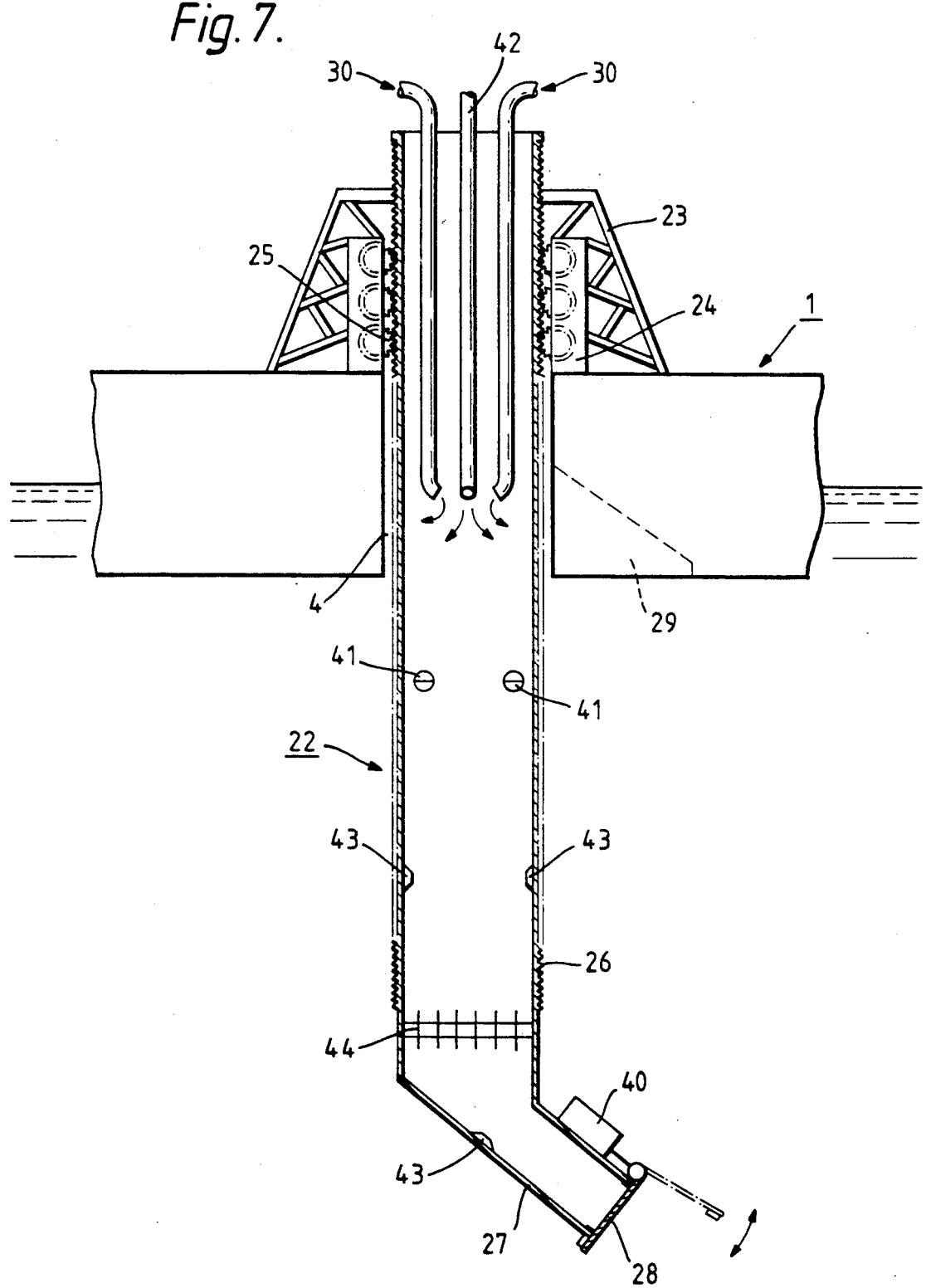
FIG. 7 is a schematic cross sectional view showing details of part of the ship shown in FIG. 5.
Figure 9:
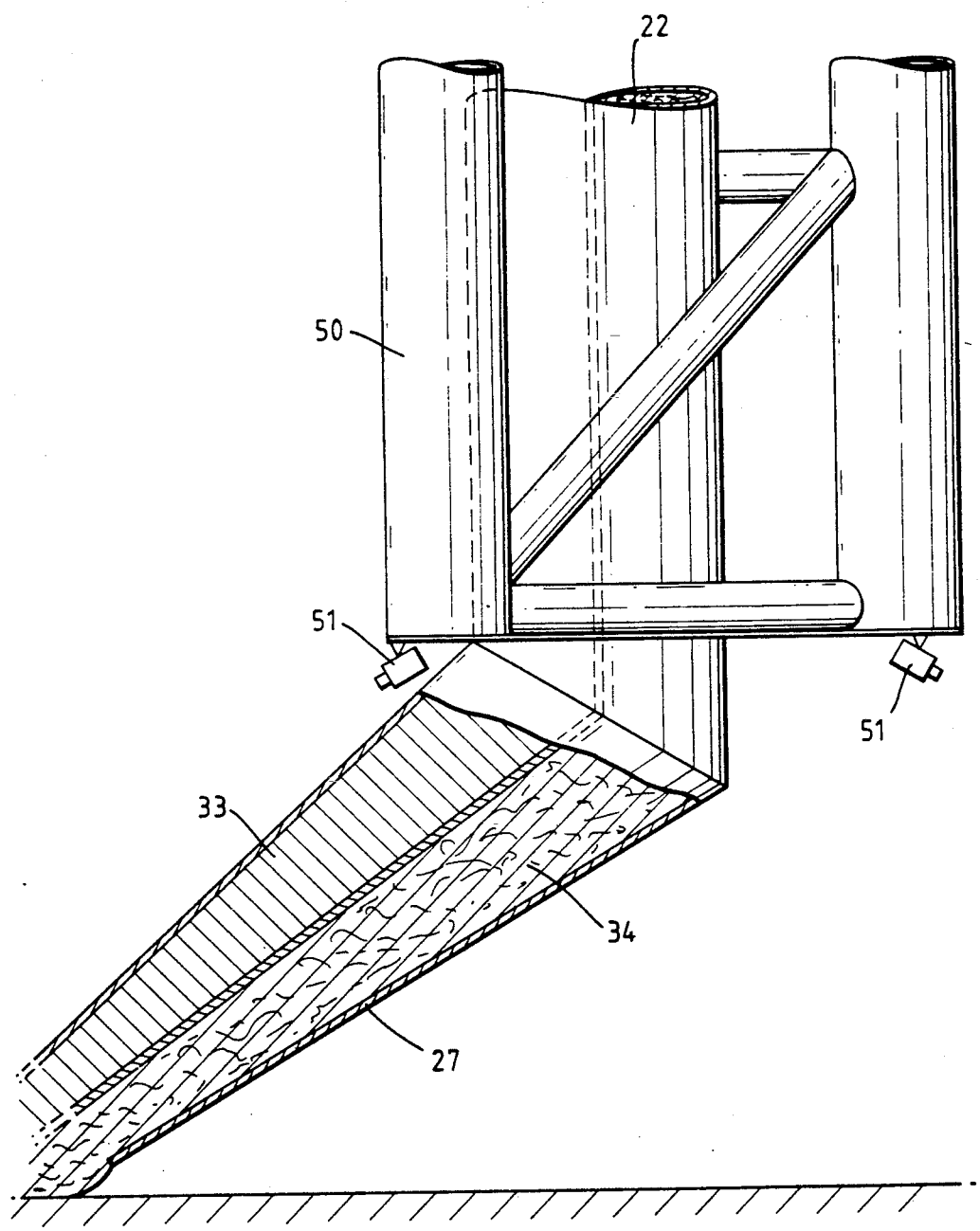
FIG. 9 is a schematic cross section showing details of the preferred form of hollow tube of FIG. 8.

Preferred features of this embodiment of the invention are shown in FIGS. 7, 8 and 9.

Referring to FIG. 7, the exit chute 27 is provided with a hydraulic ram 40 to control opening and closing of the door 12.

The tube is provided with one way valves 41 which will prevent escape of matter from inside the tube but which can allow the surrounding water to flow into the tube as waste flows out in order to maintain essentially constant the contained total volume inside the tube.

It is considered particularly desirable that waste material should be treated prior to laying at the subaqueous site. The presently preferred form of treatment is the incorporation of chemical reagents or additives to stabilise waste. Examples of such additives are flocculants and coagulants.

These additives may be mixed with the waste in a plant 31 on deck, but may be added by an injector 42, as shown in FIG. 7, as the waste enters the top of the tube. Additional injector nozzles 43 for applying chemical additives may be located at various parts of the tube and adjacent the exit chute.

In order to ensure thorough mixing of the waste with any additives an homogenising grating 44 may be placed across a lower part of the tube. It is expected that best results will be achieved in the use of the apparatus and method of this second embodiment of the invention if the waste which exits the chute is in the form of a cohesive coagulated paste like mass.

Another preferred form of this embodiment of the invention is shown in FIGS. 8 and 9. The hollow tube 22 is divided into the two sections down its length, one section containing clean waste 33 (for example, clean dredge spoil) and the other containing dirty waste 34 (for example, flocculated contaminated waste). The tube is housed in a triangular sectioned frame 50, which extends down the tube to the exit chute 27 (FIG. 9) where cameras 51 are mounted for monitoring the release of waste and the disposal site.

In the exit chute 27 the two sections of the tube are arranged so that the section containing the clean waste is disposed above the section containing the dirty waste. This ensures that as dirty waste is released from the tube clean waste is dumped on top of this dirty waste and it is thereby immediately capped.

It is to be understood this second embodiment of the invention may be put into practice either in a batch-mode or as a semi-continuous process. In the first case, as each batch of waste is loaded into the tube it is then laid onto the seabed. In the second case, waste is fed to the tube at a rate which substantially balances the rate at which waste is laid at the subaqueous site. An equilibrium is achieved whereby in operation the tube is kept part-filled. In this case, laying could be carried out continuously until such time as the supply of waste from the holds is exhausted.

I claim:

1. A method of disposal of material on subaqueous ground substantially without said material coming into contact with the surrounding water, which comprises positioning a ship carrying said material above a selected site for disposal, transferring said material to a hollow tube which is divided longitudinally to provide separate channels for passage of a first waste material and of a second waste material to the subaqueous ground, conveying said material to a level at, or close to, said subaqueous ground and depositing said first material and said second material from said longitudinally divided hollow tube on to said subaqueous ground.

2. A method as claimed in claim 1, wherein said hollow tube is disposed within a frame.

3. A method as claimed in claim 2, wherein said frame is triangular in section.

4. A method as claimed in claim 1, wherein said tube has cameras mounted thereon for visual monitoring of the disposal method.

5. A method as claimed in claim 1, wherein said hollow tube is lowered to a level at, or close to, said subaqueous ground by drive means engaging the periphery of said tube.

6. A method of disposal of waste material on subaqueous ground substantially without said material coming into contact with the surrounding water, which comprises positioning and propelling a ship carrying said material to deposit a first relatively contaminated waste material at a level at, or close to, said subaqueous ground and to deposit a second relatively uncontaminated waste material over the deposited first material, said second material being deposited over said first material simultaneously with deposition of said first material, the step of depositing said material being accomplished using a bucket as a container or vehicle for depositing said material.

7. A method as claimed in claim 6, wherein said bucket is arranged to deposit said material through a hinged door at its base.

8. A method as claimed in claim 7, wherein said hinged door is opened and closed by hydraulic or pneumatic rams.

9. A method as claim 6, wherein said bucket is conveyed to said level by a rope, cable or chain.

10. A method as claimed in 6, wherein said bucket has its internal surface provided with a non-stick coating.

11. A method as claimed in claim 1, wherein said ship is held on station at said selected site by means of satellite navigational aids and thrusters.

12. A method as claimed in claim 1, wherein said ship is held on station at said selected site by means of sensors comprising sonar transponders.

13. A method as claimed in claim 1, wherein said material is subjected to processing prior to its transfer into a container or vehicle.

14. A method as claimed in claim 1, wherein said material is subjected to processing during the step of conveying said material to said level.

15. A method as claimed in claim 1, wherein said material is subjected to processing while it is in a container or vehicle before being conveyed to said level.

16. A method as claimed in claim 13, wherein said processing is a chemical treatment.

17. A method as claimed in claim 16, wherein said chemical treatment comprises flocculation and/or coagulation.

18. A method as claimed in claim 16, wherein chemical reagents or additives are injected into said material through one or more nozzles.

19. A method as claimed in claim 16, wherein chemical reagents or additives are mixed into said material by an homogenizing grating.

20. A method as claimed in claim 1, wherein said material is dredged spoils, contaminated soil, flyash, slurry or sewerage.

21. A ship adapted for disposal of material on subaqueous ground substantially without said material coming into contact with the surrounding water, which ship includes means for carrying said material, a container or vehicle adapted to transport said material to the subaqueous ground, and a moon-pool through which said container or vehicle is conveyed to said subaqueous ground;

said container or vehicle including vent apertures provided with non-return valves which, in use, permit water to enter the container or vehicle but prevent egress of said material therefrom; and drive wheel means for engaging notched portions on the periphery of said container or vehicle.

22. A method of disposal of waste material on subaqueous ground substantially without said material coming into contact with the surrounding water, which comprises positioning and propelling a ship carrying said material to deposit a first relatively contaminated waste material at a level at, or close to, said subaqueous ground in strip-wise manner and to deposit a second relatively uncontaminated waste material over the deposited first material, said second material being deposited over said first material simultaneously with deposition of said first material.

* * * * *